US010229802B2

(12) United States Patent
Reinisch et al.

(10) Patent No.: US 10,229,802 B2
(45) Date of Patent: Mar. 12, 2019

(54) DRIVER CIRCUIT WITH CURRENT FEEDBACK

(71) Applicant: Infineon Technologies AG, Neubiberg (DE)

(72) Inventors: Hannes Reinisch, St. Oswald b. Pl. (AT); Martin D. Graefling, Graz (AT); Heimo Hartlieb, Graz (AT); Michael D. Hausmann, Gleisdorf (AT)

(73) Assignee: Infineon Technologies AG, Neubiberg (DE)

( * ) Notice: Subject to any disclaimer, the term of this patent is extended or adjusted under 35 U.S.C. 154(b) by 154 days.

(21) Appl. No.: 15/437,082

(22) Filed: Feb. 20, 2017

(65) Prior Publication Data

US 2018/0241298 A1 Aug. 23, 2018

(51) Int. Cl.
*H01H 47/32* (2006.01)
*H02M 3/156* (2006.01)
*H02M 1/00* (2006.01)
*H02M 3/155* (2006.01)

(52) U.S. Cl.
CPC .......... *H01H 47/325* (2013.01); *H02M 3/156* (2013.01); *H02M 2001/0009* (2013.01); *H02M 2003/1555* (2013.01)

(58) Field of Classification Search
CPC ........ H01H 47/325; H02M 2001/0009; H02M 3/156; H02M 2003/1555
See application file for complete search history.

(56) References Cited

U.S. PATENT DOCUMENTS

2014/0159585 A1* 6/2014 Reed ................. H05B 33/0815
315/130

* cited by examiner

*Primary Examiner* — Robert Deberadinis
(74) *Attorney, Agent, or Firm* — Shumaker & Sieffert, P.A.

(57) ABSTRACT

A circuit arrangement is described herein. In accordance with one exemplary embodiment, the circuit arrangement includes at least one output channel configured to be operably coupled to at least one load that is to be driven by the circuit arrangement. In the at least one output channel, the circuit arrangement includes a driver circuit configured to provide a modulated output signal, a current sense circuit configured to sense a load current passing through the load, and a feedback circuit configured to receive the modulated output signal and to determine, based on the modulated output signal, at least one digital value representing an average of the load current.

25 Claims, 10 Drawing Sheets

DRIVER CIRCUIT WITH CURRENT FEEDBACK

TECHNICAL FIELD

The invention relates to the field of driver circuits for driving electric loads, in particular inductive loads such as solenoid actuators.

BACKGROUND

Machines like, for example, automobiles are becoming increasingly more complex. One reason for this development is, amongst others, the replacement of mechanical components by electrical or electromechanical components and the use of electronic controllers (electronic control units, ECUs). Increased complex systems are more likely to fail and thus functional safety is an important issue in the design of technical subsystems of complex machines. In the automotive sector, the international standard ISO 26262 titled "Road vehicles—Functional safety" was established in 2011 and relates to the functional safety of electrical and electronic systems used in an automobile.

Automotive Safety Integrity Level (ASIL) refers to an abstract classification of the safety risk inherent in an automotive system or subsystems and elements of such a system. In the standard ISO 26262, a specific ASIL is established by performing a risk analysis of a potential hazard by looking at the severity, exposure and controllability of the vehicle operating scenario. There are four ASILs identified by the standard: ASIL A, ASIL B, ASIL C, ASIL D. ASIL D defines the highest integrity requirements on a specific system and ASIL A the lowest. Accordingly, the desired or required ASIL level of a specific electrical or electronic system has to be considered at the time of the system design.

The powertrain of a modern automobile includes various ECUs that are used, for example, for the engine control and the transmission control. Those ECUs are responsible, for example, for controlling the fuel injections, automatic transmission and many other subsystems. In various applications, solenoid actuators are used, e.g. in fuel injectors or in solenoid valves, which may be used to control the oil pressure in hydraulic subsystems (e.g. hydraulic actuators). Dependent on the actual application, the electronic control units that are used to control and drive electric loads such as solenoid actuators usually have to be designed to comply with a specific ASIL. One approach to reduce the risk of system failure (and thus increase the ASIL) is to increase redundancy in the ECUs. However, redundant components entail increased complexity and costs. Thus, a general design goal in the design of ECUs is to avoid redundant components without increasing the risk of system failure.

SUMMARY

A circuit arrangement is described herein. In accordance with one exemplary embodiment, the circuit arrangement includes at least one output channel configured to be operably coupled to at least one load that is to be driven by the circuit arrangement. In the at least one output channel, the circuit arrangement includes a driver circuit configured to provide a modulated output signal, a current sense circuit configured to sense a load current passing through the load, and a feedback circuit configured to receive the modulated output signal and to determine, based on the modulated output signal, at least one digital value representing an average of the load current.

Furthermore, an electronic control unit (ECU) for driving at least one load is described herein. In accordance with one exemplary embodiment the ECU includes at least one switch coupled to the at least one load and configured to switch a load current passing through the at least one load on and off. Further, the ECU includes a circuit arrangement with at least one output channel. The at least one output channel provides a modulated output signal that is supplied to a control electrode of the at least one switch. The circuit arrangement includes, in the at least one output channel, a driver circuit configured to provide a modulated output signal, a current sense circuit configured to sense a load current passing through the load, and a feedback circuit configured to receive the modulated output signal and to determine, based on the modulated output signal, at least one digital value representing an average of the load current.

BRIEF DESCRIPTION OF THE DRAWINGS

The invention can be better understood with reference to the following description and drawings. The components in the figures are not necessarily to scale, emphasis instead being placed upon illustrating the principles of the invention. Moreover, in the figures, like reference numerals designate corresponding parts. In the drawings.

DETAILED DESCRIPTION

As mentioned above, many systems of an automobile require a precise measurement and control of the load current supplied to a load, e.g. an inductive load such as a solenoid actuator or a solenoid valve. If a high ASIL is required (e.g. ASIL C or ASIL D) for an ECU, an additional, redundant current feedback path has to be provided within the ECU in order to achieve the risk reduction defined by the desired ASIL. This additional current feedback path, which operates independently from the current feedback loop used for current control, allows a current monitoring in the ECU and thus the detection of a fault (i.e. when the actual load current deviates from a set-point by more than a defined maximum deviation), and reacting on a detected fault within a specific time interval. The mentioned reaction is usually switching the actuators into a safe state within the fault tolerant time interval (FTTI). Like the ASIL, FFTIs may also be defined by the ISO 26262 standard.

One illustrative example of a safety-critical ECU is the transmission control unit (TCU), which may be used to control the automatic transmission of an automobile. In this example, the FTTI is approximately 150-300 ms for the electromechanical system (TCU plus solenoid actuators and other mechanical components coupled thereto) and approximately 50-100 ms for the electrical subsystem (essentially the ECU). In this example, the load current set-points supplied to the solenoid actuators may be between approximately 0.2 and 1.5 A, the accuracy of the current control (control error) is usually 1-2 percent, whereas the accuracy of the current monitoring may be in the range of 10-30 percent. In hydraulic applications such as transmission control, the solenoid current may be proportional to an oil pressure. It is emphasized, however, that the transmission control is merely one of a plurality of applications, in which an ECU drives a load using a load current control loop. The driven load is not necessarily an inductive load. Furthermore, the numerical values specified above are also rough estimations and heavily depend on the actual application.

Figure 1:
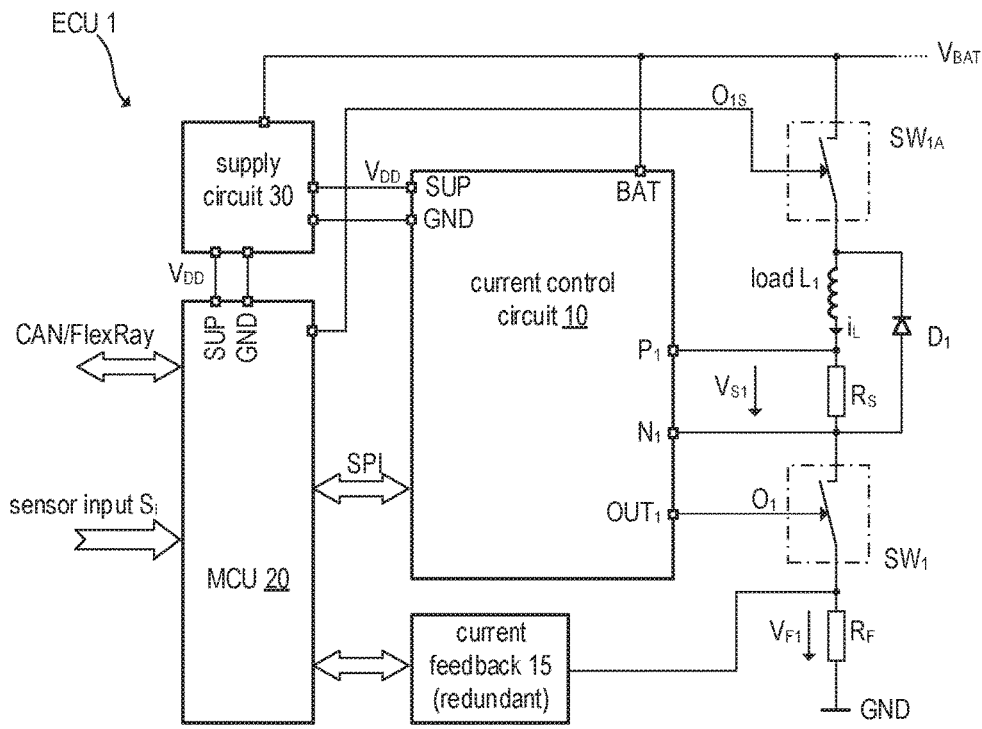
FIG. 1 illustrates one example of an ECU that includes an integrated current control circuit (current control IC) for controlling the current provided applied to a solenoid actuator and an additional external current feedback path.

FIG. 1 is a schematic block diagram illustrating one exemplary ECU that may be used to drive solenoid loads. However, any other type of load (e.g. resistive, capacitive) may be driven in a similar manner. The exemplary ECU 1 of FIG. 1 includes a current control circuit 10, a controller circuit 20 (e.g. a micro controller unit, MCU), a supply circuit 30, and electronic switches $SW_1$ and $SW_{1A}$ for switching the load current $i_L$ that passes through the (inductive) load $L_1$ on and off. The electronic switches $SW_1$ and $SW_{1A}$ may be implemented as transistors, e.g. MOSFETs. A shunt resistor $R_S$ may be connected in series to the load $L_1$; the voltage drop $V_{S1}$ across the shunt resistor may be sensed by the current control circuit 10 (at input pins $P_1$ and $N_1$) and used for the load current control. Any other current sensing techniques may be used instead to the shunt resistor (e.g. a sense FET included in the MOSFET forming switch $SW_1$). In case of an inductive load, a free-wheeling diode $D_1$ may be connected to the load $L_1$. In the present example, the free-wheeling diode $D_1$ is connected parallel to the series circuit of load $L_1$ and shunt resistor $R_S$. The (optional) switch $SW_{1A}$, the load $L_1$, the shunt resistor $R_S$, and the switch $SW_1$ are coupled in series between a supply terminal providing battery voltage $V_{BAT}$ and ground GND. The current control IC 10 may also receive battery voltage $V_{BAT}$ at input pin BAT.

The current control circuit 10 may be an integrated circuit (IC) referred to as current control IC. One or both of the electronic switches $SW_1$ and $SW_{1A}$ as well as the shunt resistor $R_S$ may be integrated in the current control IC 10. However, in the present examples the electronic switches $SW_1$ and $SW_{1A}$ and the shunt resistor $R_S$ are external components (external to the current control IC). The switch $SW_1$ is controlled by the current control IC 10 via output pin $OUT_1$, at which the drive signal $O_1$ is provided. The switch $SW_{1A}$ is optional and may be controlled by the MCU 20 that generates drive signal $O_{1A}$. In case the switches are implemented as MOSFETs the drive signals are supplied to the gate terminals of the respective MOSFETs.

The circuit components of the ECU 1 shown in FIG. 1 may be mounted on one or more circuit boards (PCBs, printed circuit boards). The load $L_1$ itself is, of course, not part of the ECU but connected externally thereto. The supply circuit 30 receives battery voltage $V_{BAT}$ and is configured to generate, based on the battery voltage $V_{BAT}$, a supply voltage $V_{DD}$ for the MCU 20 and the current control IC 10 (e.g. 5 V or 3.3 V). The MCU 20 is the master controller in the ECU 1. It may be connected to a bus such as, for example, a field bus like FlexRay, CAN (Controller Area Network) or similar, in order to communicate with external devices (other ECUs, sensors, etc). The MCU 20 receives one or more sensor signals $S_i$, which may be received via the mentioned bus system (CAN, FlexRay, etc.) or via a separate interface such as, for example, a LIN (local interface network) bus interface. The sensor signals $S_i$ may be used to control the operation of the connected load $L_1$, for example to determine the set-point of the load current $i_L$. The mechanism how the current set-point is determined is as such known and thus not explained herein in more detail. The MCU 20 may communicate with the current control IC 10 using analog or digital signals. In the present example, the MCU 20 and the current control IC 10 are connected via an SPI (Serial Peripheral Interface) bus, which is a serial bus. However, other types of busses (e.g. an $I^2C$ bus) may be also be used.

As mentioned above, a current monitoring that is independent from the current control loop may be necessary in order to comply with a desired ASIL, e.g. ASIL C. A conventional approach might be to provide separate current feedback circuit (see FIG. 1, circuit 15) external to the current control IC. In the present example, an additional shunt resistor $R_F$ is connected between ground and the electronic switch $SW_1$; the voltage $V_{F1}$ across the resistor $R_F$ is supplied to the current feedback circuit 15 which is configured to process the voltage signal $V_{F1}$ and supply the current information to the MCU 20. For example, the current feedback circuit 15 may be configured to communicate with the MCU 20 via the SPI bus in the same manner as the current control IC 10. Any other analog or digital signaling may be used instead of an SPI bus. Furthermore, it is understood that any other current sensing technique may be used instead of the additional shunt resistor $R_F$. According to one exemplary alternative, the voltage $V_S$ across the shunt resistor $R_S$ may also be supplied to the current feedback circuit 15 instead of the voltage $V_F$.

As can be seen from FIG. 1, the external current feedback circuit 15 requires additional external circuitry and thus increases the overall system costs. Furthermore, the additional external circuitry may occupy additional input pins of the MCU 20 and consume computational power of the MCU 20. The mentioned consequences of the additional external circuitry are even worse when considering that a real current control IC 10 does not only have one output channel (for connecting a single load $L_1$) but rather a plurality of output channels (for connecting a plurality of loads $L_1$, $L_2$, $L_3$, . . . ) that may operate simultaneously. For the sake of simplicity, FIG. 1 includes only one output channel. However, it is understood that all external components (external to the current control IC 10) like switches $SW_1$, $SW_{1A}$, shunt resistors $R_S$, $R_F$, free-wheeling diode $D_1$, etc. has to be duplicated for each additional output channel.

Figure 2:
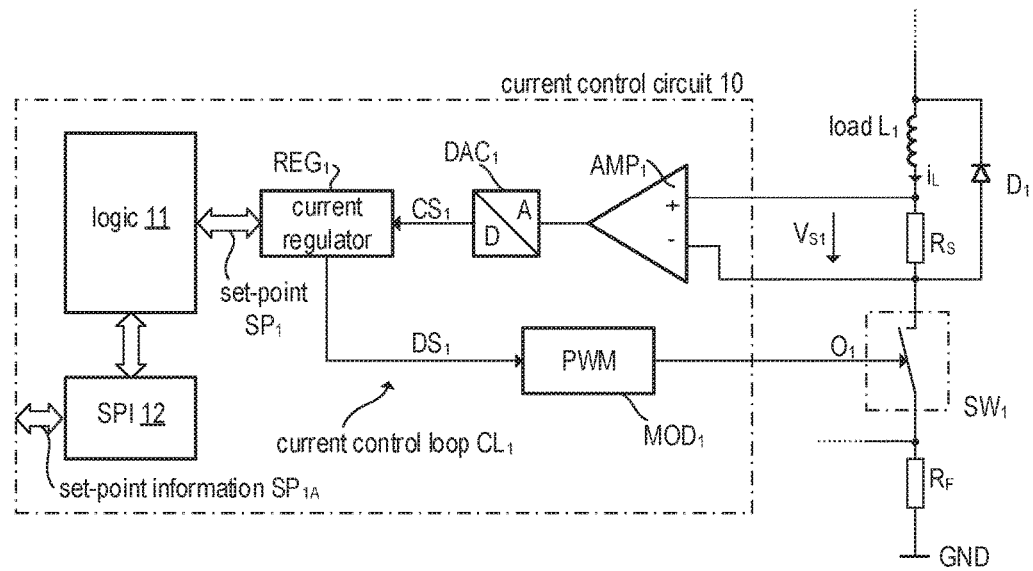
FIG. 2 illustrates one example of the current control loop included in the current control IC shown in FIG. 1.

FIG. 2 is a schematic block diagram illustrating one exemplary implementation of the current control loop included in the current control IC 10 in more detail. According to the present example, the current control IC 10 includes (for each channel, only one channel is, however, depicted) an amplifier $AMP_1$ that receives the voltage $V_{S1}$, which represents the load current $i_{L1}$ through the load $L_1$ ($V_{S1}=R_{S1}\cdot i_{L1}$). More complex circuitry may be needed if other current sensing techniques are used. The output of the amplifier $AMP_1$ is supplied to analog-to-digital converter $DAC_1$ that converts the amplified analog current sense signal (e.g. voltage $V_{S1}$) into the digital current sense signal $CS_1$.

The digital current sense signal $CS_1$ is supplied, as input signal, to current regulator $REG_1$, which also receives a current set-point $SP_1$. The current regulator $REG_1$ determines, based on the current sense signal $CS_1$ and the current set-point $SP_1$, a controller output signal $DS_1$. Any known control scheme may be implemented in the current regulator $REG_1$; the current regulator $REG_1$ may, for example, be a proportional-integral (PI) regulator, a proportional (P) regulator or a proportional-integral-derivative (PID) regulator. Other types of regulators may also be used as an alternative.

In the present example, the controller output signal $DS_1$ represents the desired duty cycle of a driver circuit which may be or include a modulator $MOD_1$ (e.g. a pulse-width modulator, PWM) that is configured to modulate the controller output signal $DS_1$ in accordance with a defined modulation scheme (e.g. pulse-width modulation). The modulator output signal $O_1$ is a binary signal which has only two states, on (high level) and off (low level). As shown in FIG. 2, the modulator output signal $O_1$ is used to drive the electronic switch $SW_1$ on and off. In case the switch $SW_1$ is implemented as a MOSFET, the modulator output signal $O_1$ is supplied to the gate terminal of the MOSFET. Dependent on the application, a gate driver circuit (not shown) may be used. Amplifier $AMP_1$, analog-to-digital converter $DAC_1$, current regulator $REG_1$, and modulator $MOD_1$ form a control loop $CL_1$ within the current control IC 10.

As shown in FIG. 2, the current control IC 10 may include a logic circuit 11 and a communication interface 12, which may be—as in the present example—an SPI bus interface. The communication interface 12 may be used to communicate with a superordinate controller circuit such as the MCU 20 of an ECU (see FIG. 1). The control logic 11 is configured to determine the current set-point $SP_1$ for the current regulator $REG_1$ based on information received from the MCU 20 via the communication interface 12. The logic circuit 11 may receive, for example and updated current set-point $SP_{1A}$ from the MCU 20 via the communication interface 12 and apply a dither (having a defined frequency) to this set-point $SP_{1A}$. That is, the current set-point $SP_1$ provided to the current regulator $REG_1$ is a superposition of the original set-point $SP_{1A}$ received from the MCU 20 and the mentioned dither. Appling dither is a known technique to avoid slip-stick effects in electromechanical loads such as solenoid actuators or solenoid valves. At this point it should be mentioned that the carrier frequency of the modulator $MOD_1$ (PWM frequency), the dither amplitude and frequency may also be set by the MCU 20 via the communication interface 12. Thus, the current control IC 10 may be configurable by the ECU designer and adapted to the desired application and the loads to be connected.

Referring again to FIG. 1 it is noted that—in case the current control IC 10 applies dithering as mentioned above—the external current feedback 15, which operates independently from the current control IC 10, needs to perform an averaging in order to average out that portion of the load current that is caused by dithering. If the current control IC 10 operates correctly, the average load current should match (within given tolerances) with the set-point $SP_{1A}$ received by the current control circuit 10 from the MCU 20 (before the dither is applied). As the carrier frequency the modulator $MOD_1$ as well as the dither frequency may be different in different applications, the external current feedback 15 needs to be adapted specifically for the desired application. For example, an averaging time used in the current feedback 15 to average the feedback signal (e.g. voltage $V_{F1}$) may be synchronized with the time period of the dither. Such a synchronization may be difficult with a redundant external feedback path.

Figure 3:
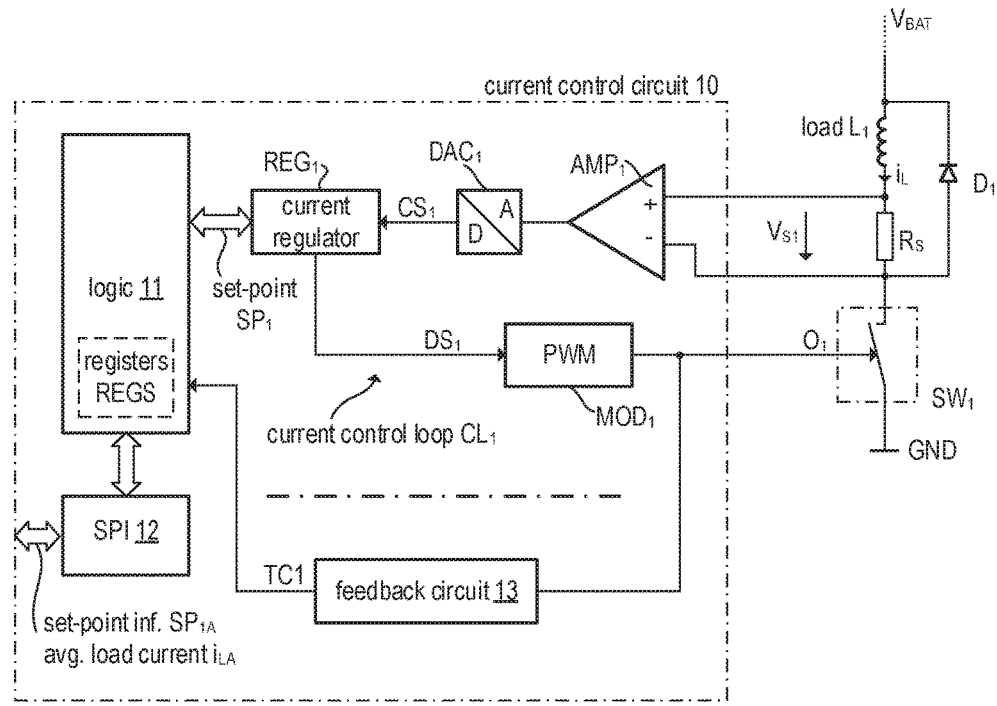
FIG. 3 illustrates one example of a current control circuit with a redundant internal current feedback path which may be used to drive electric loads such as solenoid actuators.

FIG. 3 illustrates another example of the current control IC 10, which includes an additional (redundant) internal feedback circuit 13 that is configured to provide information about the average load current. The components forming the current control loop $CL_1$, the communication interface 12 and (in large parts) the logic circuit 11 is identical with the example of FIG. 2 and reference is made to the respective description above. In the present example, the feedback circuit 13 receives, as input signal, the modulator output signal $O_1$ and determines, based on the input signal, a at least one digital value TC1 representing the average load current $i_{LA}$, so that disturbances such as noise and the mentioned dither average out (i.e. cancel out by averaging). The digital value TC1 determined by the feedback circuit 13 is communicated to the MCU 20 via the communication interface 12 (e.g. an SPI bus interface). For this purpose the at least one digital value TC1 determined by the feedback circuit 13 may be regularly written to at least one register REGS included in the logic circuit 11. The up-to-date register values, which include information about the average load current $i_{LA}$, may then be communicated to the MCU 20. For example, the MCU 20 may regularly poll the register values via the SPI bus. Alternatively, the current control IC 10 may be configured to actively send the register values to the MCU 20 in defined time intervals. Based on the at least one digital value TC1 and further known parameters (e.g. the PWM carrier frequency used by the modulator $MOD_1$) the MCU 20 may calculate the average load current $i_{LA}$.

At this point, it should be emphasized that—although the feedback circuit 13 is integrated within the current control IC 10—the feedback circuit 13 operates completely independently from the current control loop $CL_1$. In other words, the feedback circuit 13 and the current control loop $CL_1$ are functionally separate from each other. That is, the feedback circuit 13 and the circuit components forming the current control loop $CL_1$ may be integrated in one semiconductor die or in two separate semiconductor dies arranged in one chip package; in either case the current control circuit 10 includes circuitry configured to detect and/or avoid common cause failures (CCF) of the feedback circuit 13 and the current control loop $CL_1$. If common cause failures are avoided, the operation of the feedback circuit 13 and the current control loop $CL_1$ may be regarded as independent from each other (i.e. functionally separate). When using the current control circuit 10 according to FIG. 3, the MCU 20 may perform current monitoring, which is independent from the operation of the current control loop $CL_1$ without requiring a separate external current feedback circuit as it is the case in the example of FIG. 1 (also the second shunt resistor $R_F$ is omitted in the example of FIG. 3). Furthermore, the approach shown in the example of FIG. 3 allows, for example, to flexibly adjust the time interval used for averaging the estimated load current and to synchronize the averaging with, e.g. the dither period. For example, the time interval may be set equal to or to an integer multiple of the period of the dither applied to the set-point $SP_{1A}$ as described above. The time interval used for averaging may be set, e.g., by the MCU 20 via the communication interface 12.

Figure 4:
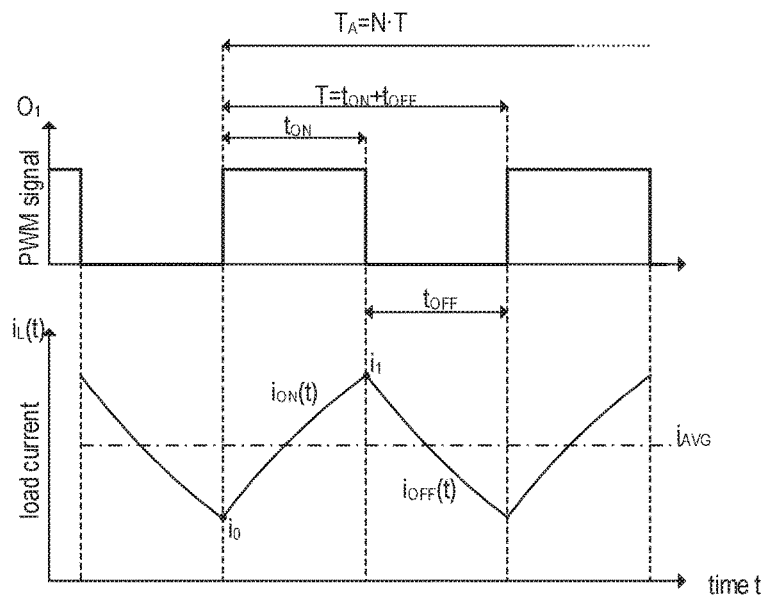
FIG. 4 is an exemplary timing diagram illustrating the load current through a solenoid actuator.

The internal function of the feedback circuit 13 depends on how the load is connected to the current control IC 10, and how the current sensing and the free-wheeling is implemented. The timing diagrams of FIG. 4 illustrate exemplary waveforms. The top diagram of FIG. 4 illustrates one exemplary waveform of the output signal $O_1$ of modulator $MOD_1$ (see FIG. 3), which is also received by the feedback circuit 13. In the present example, the output signal $O_1$ is a PWM signal. The period of the PWM signal $O_1$ is denoted as T, the on-time as $t_{ON}$ and the off-time as $t_{OFF}$, wherein the period T is the sum of on-time $t_{ON}$ and off-time $t_{OFF}$ (T=$t_{ON}$+$T_{OFF}$) and the duty cycle D is the ratio $t_{ON}$/T (D=$t_{ON}$/T). Below, the inductance of the load $L_1$ is denoted as L and the total (ohmic) resistance "seen" by the load current is denoted as $R_T$. During the on-time the resistance $R_T$ is the sum of the resistances of the shunt resistor $R_S$, the on-resistance $R_{ON}$ of the switch $SW_1$ and the ohmic resistance $R_L$ of the load $L_1$ ($R_T$=$R_S$+$R_{ON}$+$R_L$). During the off-time the resistance $R_T$ is the sum of the resistances of the shunt resistor $R_S$, the on-resistance $R_D$ of the free-wheeling diode $D_1$ and the ohmic resistance $R_L$ of the load $L_1$ ($R_T$=$R_S$+$R_D$+$R_L$). Accordingly, the theoretic maximum load current $i_{MAX}$ is $V_{BAT}/R_T$ ($i_{MAX}$=$V_{BAT}$/($R_S$+$R_{ON}$+$R_L$)).

The bottom diagram of FIG. 4 illustrates one exemplary waveform of the load current $i_L$ passing through the load $L_1$. The load current waveform corresponds to the PWM signal waveform. The load current waveform is composed of rising branches and falling branches, and the load current varies between the peak values $i_0$ and $i_1$. During the on-time (rising branch $i_{ON}(t)$), the load current is represented by the following function $$i_{ON}(t) = i_{MAX} + e^{-t/\tau_{ON}}(i_0 - i_{MAX}), \quad (1)$$

while, during the off-time (falling branch $i_{OFF}(t)$), the load current is represented by the following function.

$$i_{OFF}(t) = i_1 \cdot e^{-t/\tau_{OFF}}, \quad (2)$$

The average current $i_{LA}$ may represented by the following equation $$i_{LA} = \frac{1}{T}\left(\int_0^{t_{ON}} i_{ON}(t)dt + \int_0^{t_{OFF}} i_{OFF}(t)dt\right), \quad (3)$$

wherein the averaging period T may equal the period of the (PWM) carrier frequency used by the modulator $MOD_1$. Solving the integral in equation 3 yields $$i_{LA} = i_{MAX} \cdot D + (i_1 - i_0)\frac{\tau_{OFF} - \tau_{ON}}{T} = i_{MAX} \cdot D + \text{offset}, \quad (4)$$

wherein the time constants $\tau_{ON}$ and $\tau_{OFF}$ can be expressed by the following equations $$\tau_{ON} = \frac{L}{R_L + R_S + R_{ON}} \text{ and } \tau_{OFF} = \frac{L}{R_L + R_S + R_D}. \quad (5)$$

By substituting the time constants $\tau_{ON}$ and $\tau_{OFF}$ equation 4 may be transformed into $$i_{LA} = i_{MAX} \cdot \left(D + \frac{(1 - e^{-a})(1 - e^{-b})}{1 - e^{-(a+b)}} \cdot \frac{\tau_{OFF} - \tau_{ON}}{T}\right), \quad (6)$$

wherein a=$t_{OFF}/\tau_{OFF}$, b=$t_{ON}/\tau_{ON}$, and D is the duty cycle of the PWM signal. It is noted that, in equations 3 to 6, the average current $i_{LA}$ represents the average load current in one PWM period, as the time period T is the PWM time period. An averaging throughout two or more PWM periods may be readily accomplished by setting the time period T (see eqn. 6) to an integer multiple of the PWM period. In this case, the time periods $t_{ON}$ and $t_{OFF}$ are the cumulated on-times and off-times throughout the time period T (averaging time). It is understood, that only one of the on-time $t_{ON}$ and the off-time $t_{OFF}$ needs to be measured as $t_{OFF}$=T-$t_{ON}$. The measurement of the (cumulated) on-time $t_{ON}$ (or off-time $t_{OFF}$) may be accomplished using known circuitry such as gates and counters. It is understood that a modulated signal such as the PWM signal can be regarded as a binary signal, i.e. a sequence of consecutive pulses, wherein each pulse has a pulse length (i.e. on-time) followed by a pause (i.e. the off-time). The cumulated on-time $t_{ON}$ throughout an averaging time period T is thus the sum of all pulse lengths of all pulses within the averaging time period T. Analogously, the cumulated off-time $t_{OFF}$ throughout the averaging time period T is the sum of all pulse lengths of all pulses within the averaging time period T. If the averaging time period T equals only a single PWM period, the cumulated on-time $t_{ON}$ is equal to the on-time of the current PWM period. If the averaging time period T equals an integer multiple of PWM period, the average duty cycle D may be calculated as D=$t_{ON}$/T (in case of pulse width modulation), wherein $t_{ON}$ is the mentioned cumulated on-time throughout an averaging time period T.

The above equations 1 to 6 shown that the average load current $i_{LA}$ may easily be calculated based on the on-time and off-time (duty cycle D=$t_{ON}/(t_{ON}+t_{OFF})$) and the mentioned time constants $\tau_{ON}$ and $\tau_{OFF}$. Is is noted that, in addition to the on- and off-times, the maximum current $i_{MAX}$ needs to be known. This current $i_{MAX}$ ($i_{MAX}$=$V_{BAT}$/($R_S$+$R_{ON}$+$R_L$)) may be regarded as a constant factor when the battery voltage $V_{BAT}$ is considered as constant. In some applications, it may be sufficient to consider $i_{MAX}$ as a constant factor. However, if a precise estimation is desired, the voltage $V_{BAT}$ can also be monitored and used to determine a more accurate value of the current $i_{MAX}$.

Figure 5A:
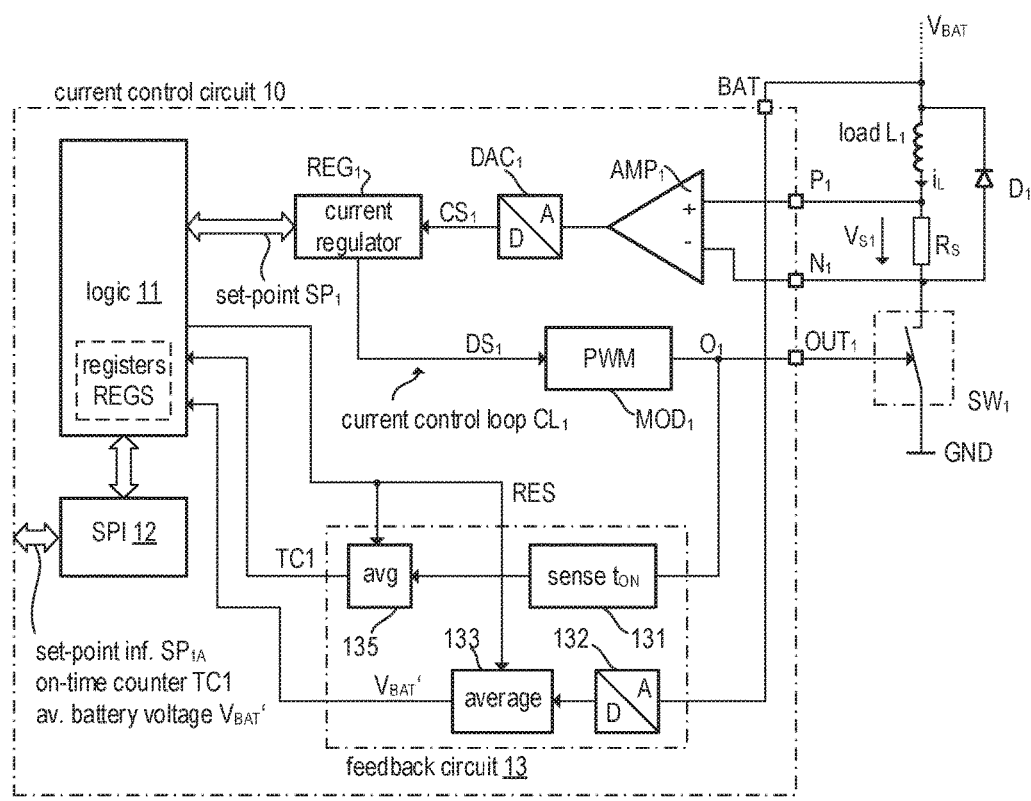
FIG. 5A-E illustrates various variants of another example of a current control circuit with a redundant internal current feedback path and battery voltage monitoring.

FIGS. 5A-D illustrate four different variants of another example of a current control IC with an internal redundant feedback circuit 13 including battery voltage monitoring. The example of FIG. 5A is substantially the same as the previous example of FIG. 3 except that the feedback circuit 13 is illustrated in more detail and provides an additional battery voltage monitoring. The circuit components forming the current control loop $CL_1$, the logic circuit 11 and the communication interface 12 are essentially the same as in FIG. 3 and reference is made to the respective explanations. The feedback circuit 13 includes a circuit 131 configured to measure the on-time $t_{ON}$ of the modulated output signal $O_1$. Measurement of the on-time $t_{ON}$ may be sufficient as $t_{OFF}$ equals T-$t_{ON}$ and T usually is the known period of the (PWM) carrier frequency. Alternatively, the off-time $t_{OFF}$ may be measured. The averaging of the on-time $t_{ON}$ is represented by circuit 135, connected to the circuit 131 downstream thereof. Dependent on the actual implementation, the function provided by circuits 131 and 135 may also be provided by a single circuit. As mentioned, the circuit 135 may include a counter which is configured to count clock cycles of a clock signal during the on-time periods of the modulated output signal $O_1$ throughout an averaging time period T (e.g. the PWM period or an integer multiple thereof or the dither period or an integer multiple thereof). At the end of each averaging period, an updated digital value TC1 is provided representing the (cumulated) on-time $t_{ON}$ throughout the averaging time period T.

The feedback circuit 13 further includes an analog-to-digital-converter 132 configured to digitize the battery voltage $V_{BAT}$ and provide a respective digital signal. The digital representation of the battery voltage $V_{BAT}$ may be averaged (see FIG. 5A, circuit 133) and the resulting averaged battery voltage value $V_{BAT}'$ may be used in the current estimation (see equation 6), wherein the maximum current $i_{MAX}$ may be calculated based on the value $V_{BAT}'$, for example $i_{MAX}=V_{BAT}'/(R_S+R_{ON}+R_L)$. Averaging the battery voltage may be good for suppressing undesired voltage spikes and other disturbances on the battery line. However, the averaging block 133 may be omitted dependent on the application. Furthermore an analog low-pass filtering may be applied upstream to the analog-to-digital converter 132 instead of the averaging circuit 133.

The actual calculation of the average load current $i_{LA}$ may be performed later by the MCU 20 (see FIG. 1) in accordance to equation 6. As shown in FIG. 1, the MCU 20 may be connected to the current control circuit 10 via a digital bus, via which the digital value TC1 and the averaged battery voltage value $V_{BAT}'$ can be received. As mentioned, the current calculation as represented by equation 6 depends on how the load is connected to the current control circuit 10, how the current sensing and the free-wheeling is accomplished. A different equation may be used in other examples. Furthermore, the averaging may be synchronized with the operation of the current control loop $CL_1$. For example, the averaging (circuits 135 and 133) may be reset (reset signal RES provided by logic circuit 11) when a new set-point $SP_{LA}$ is receive from MCU 20. Thus, the averaging may also be synchronized to the dither applied to the set-point $SP_{LA}$.

At this point it should be noted that—as the feedback circuit 13 is integrated in the same chip as the current control loop $CL_1$—the averaging accomplished by circuits 133 and 135 may be not only synchronized with the carrier frequency of the (PWM) modulator $MOD_1$ and/or with the frequency of the above-mentioned dithering included in the current set-point $SP_1$; the averaging time period may also arbitrarily set by the MCU 20 via the communication interface 12.

Figure 5B:
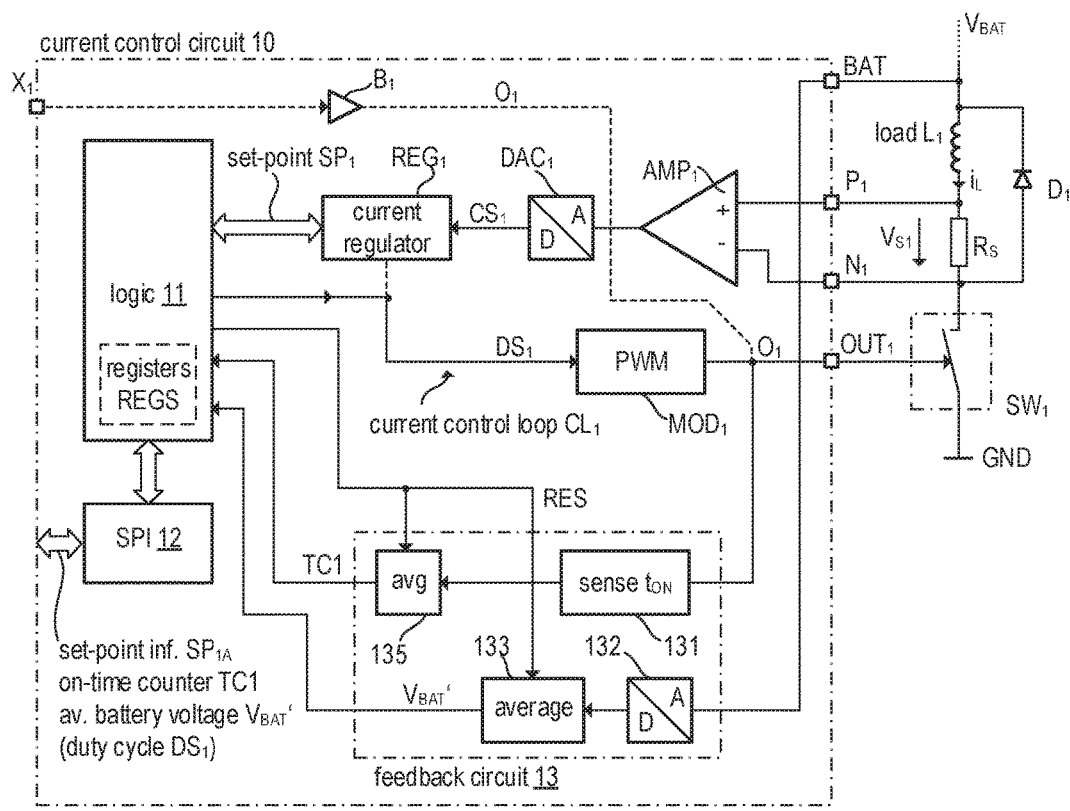

Dependent on the application of the current control circuit 10, it may be desired to bypass the current regulator $REG_1$ and either directly set the duty cycle $DS_1$ of the modulator $MOD_1$ or provide circuity allowing to feed through an externally generated (e.g. by MCU 20) modulated signal $O_1$ used for switching the switch SW1 on and off. The example shown in FIG. 5B is a minor modification of the example of FIG. 5A. As compared to FIG. 5A, FIG. 5B includes an additional line coupling input pin $X_1$ with output pin $OUT_1$ via a simple buffer $B_1$ (see FIG. 5B, dashed line), which allows to receive the modulated output signal $O_1$ at input pin $X_1$ and to bypass the current regulator $REG_1$ and the modulator $MOD_1$. In this case the current regulator $REG_1$ and the modulator $MOD_1$ may be deactivated. Current regulation and generation of the modulated output signal $O_1$ may thus be accomplished by other circuitry (e.g. the MCU 20, see FIG. 1). Alternatively, the logic circuit 11 may be configured to receive, via the communication interface 12, information concerning the duty cycle of the modulator $MOD_1$ and to set the duty cycle value $DS_1$ used by the modulator MOD 1, accordingly. In this case only the current regulator $REG_1$ is bypassed. To summarize the above, the example 5B allows three different modes of operation. In the first mode, the logic circuit 11 sets the current set point $SP_1$ used by the regulator $REG_1$ based on current set-point information (e.g. set-point $SP_{LA}$) received via the communication interface 12. In the second mode, the logic circuit 11 sets the duty-cycle of the modulator $MOD_1$ directly (thus bypassing the regulator $REG_1$). In the third mode, the modulated output signal $O_1$, which is provided at output pin $OUT_1$ and used to switch the switch $SW_1$ on and off, is generated by other circuitry and fed through the current control circuit 10 (thus bypassing the regulator $REG_1$ and modulator $MOD_1$). It is noted that, in the present example, the driver circuit includes the buffer $B_1$ besides the modulator $MOD_1$. However, the modulator $MOD_1$ and the regulator $REG_1$ may be omitted dependent on the actual implementation.

Figure 5C:
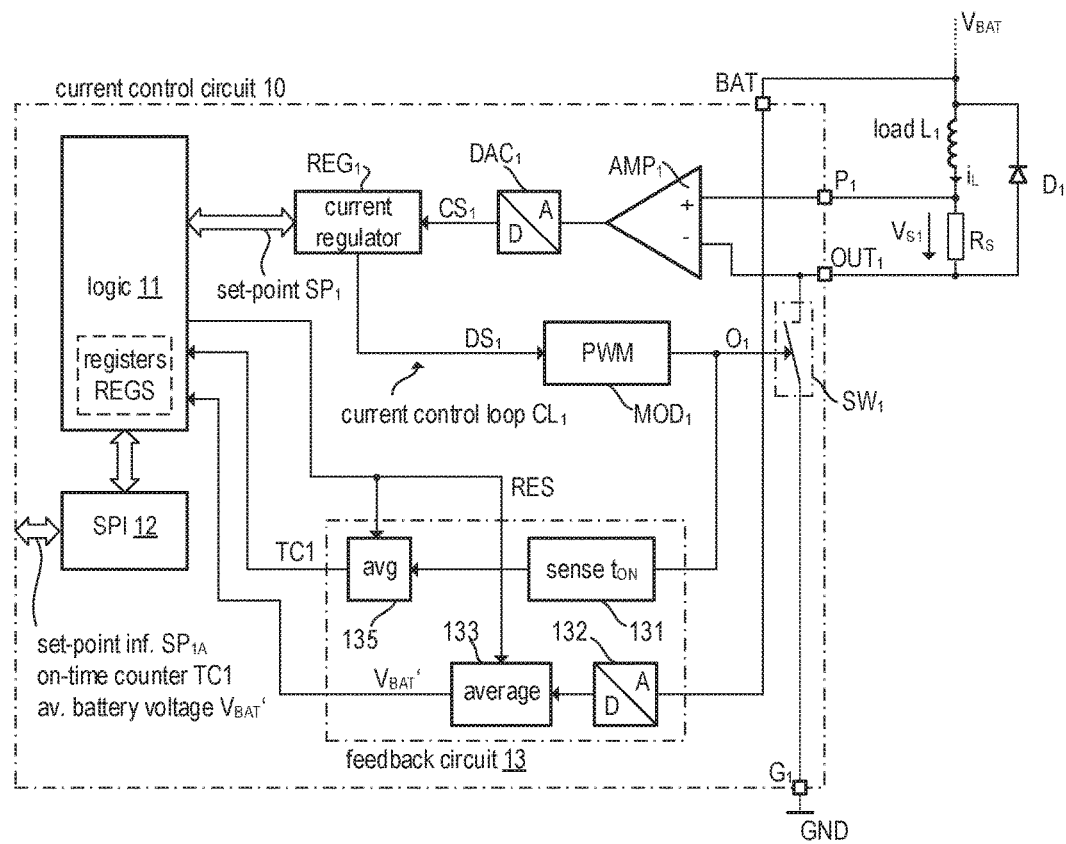

The example of FIG. 5C is essentially the same as the example of FIG. 5A except that the switch $SW_1$ is included in the current control circuit 10. In contrast to FIG. 5A, the output pin $OUT_1$ does not provide the modulated output signal $O_1$ but is connected to a first load terminal (e.g. drain terminal in case of an n-channel MOSFET) of switch SW1, which is now included in the current control circuit 10. A second load terminal (e.g. source terminal in case of an n-channel MOSFET) of switch SW1 is internally connected to a ground pin $G_1$. The voltage drop $V_{S1}$ across shunt resistor $R_S$ is sensed between the output pin $OUT_1$ and sense pin $P_1$. The load $L_1$ and the free-wheeling diode $D_1$ are connected to the current control circuit as in the example of FIG. 5A.

Figure 5D:
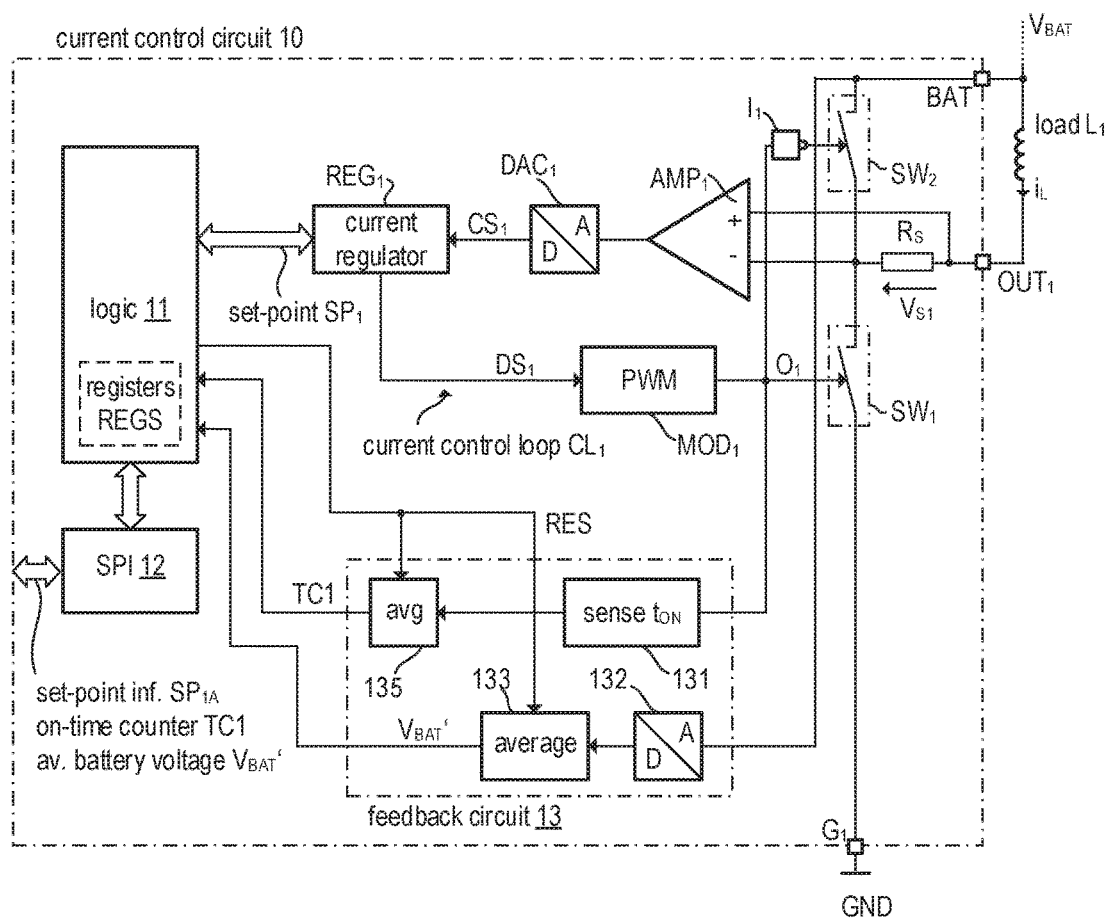

The example of FIG. 5D is essentially the same as the example of FIG. 5C except that active free-wheeling is used (i.e. diode $D_1$ is replaced by a second internal electronic switch $SW_1$), and that the shunt resistor $R_S$ is also included in the current control circuit 10. As can be seen in FIG. 5D, the second switch $SW_2$ is switched inversely to the first switch $SW_1$. That is, the second switch $SW_2$ receives the inverted modulated output signal $\bar{O}_1$ (generated by inverter $I_1$) at its control electrode. In the present example, the switches $SW_1$ and $SW_2$ form a half-bridge and the internal shunt resistor $R_S$ couples the half-bridge output with the output pin $OUT_1$. The load $L_1$ is connected between the battery line and the output pin $OUT_1$. In a thriller example (not shown), the current control circuit may include a half-bridge as in FIG. 5D but an externally connected shunt resistor $R_S$.

Figure 5E:
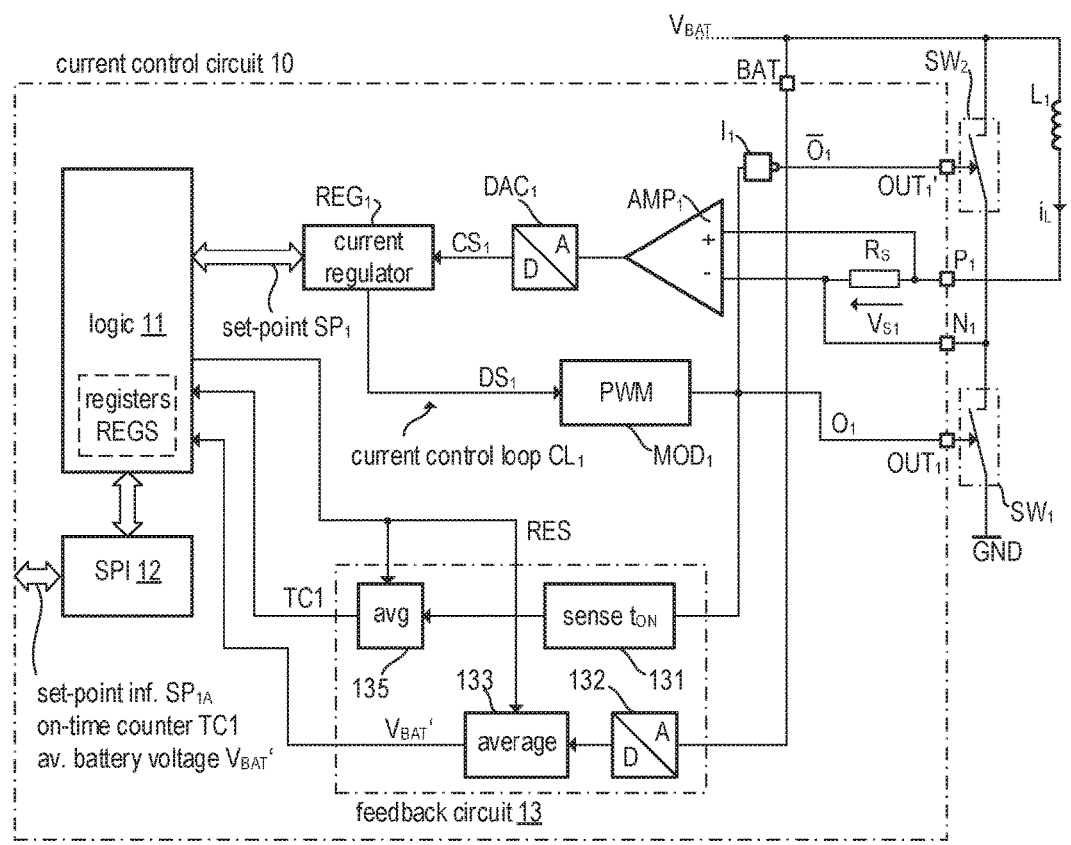

The example of FIG. 5E is essentially the same as the example of FIG. 5D except that the transistor half-bridge composed of the switches $SW_1$ and $SW_2$ are connected externally to the current control circuit 10. Accordingly, the inverted modulated output signal $\bar{O}_1$ is provided at output pin $OUT_1$. wherein the load $L_1$ is connected between pin $P_1$ and supply potential $V_{BAT}$. Pin $N_1$ is connected to the output node (middle tap) of the transistor half-bridge. The electric function of the example of FIG. 5E may be identical as the electric function of the previous example of FIG. 5D.

Figure 6:
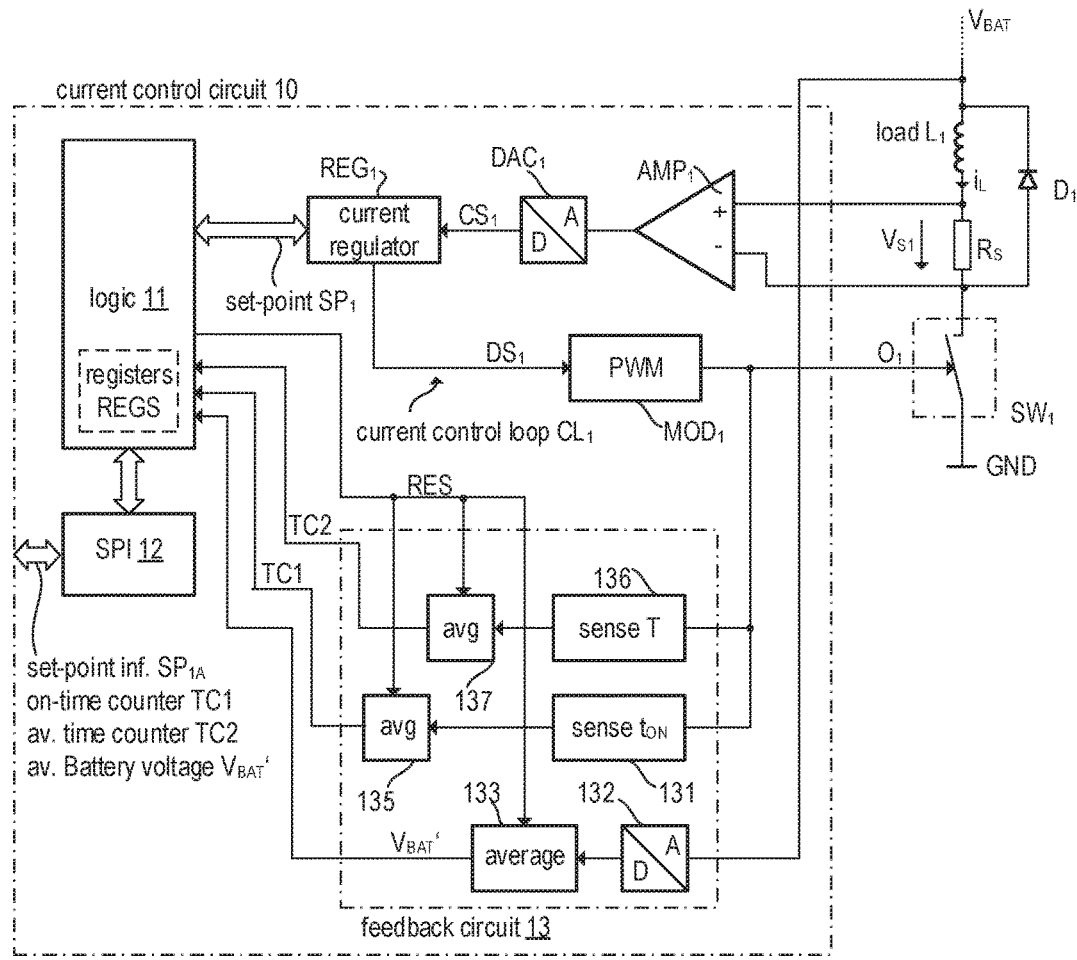
FIG. 6 illustrates a further example, which is a modification of the example of FIG. 5A.

FIG. 6 illustrates a further example which is a modification of the example of FIG. 5A. The example of FIG. 6 is almost identical with the previous example of FIG. 5A except that the time period of the PWM carrier signal is also sensed and averaged in addition to the on-time $t_{ON}$. Circuit 136 for sensing the time period T and circuit 137 for performing the mentioned averaging may be implemented substantially in the same manner as circuits 131 and 135, respectively. Analogously to the on-time measurement, the time period T may span one PWM period or an integer multiple thereof. The digital value TC2 provided by circuit 137 thus represents the averaging time T (one or more PWM periods), whereas the digital value TC1 represents the cumulated on-time $t_{ON}$. These values TC1, TC2 may be stored in the registers REGS and regularly updated and communicated to MCU 20, which is able to calculate the sought average load current $i_{LA}$ (see equation 6) based on these values.

Figure 7:
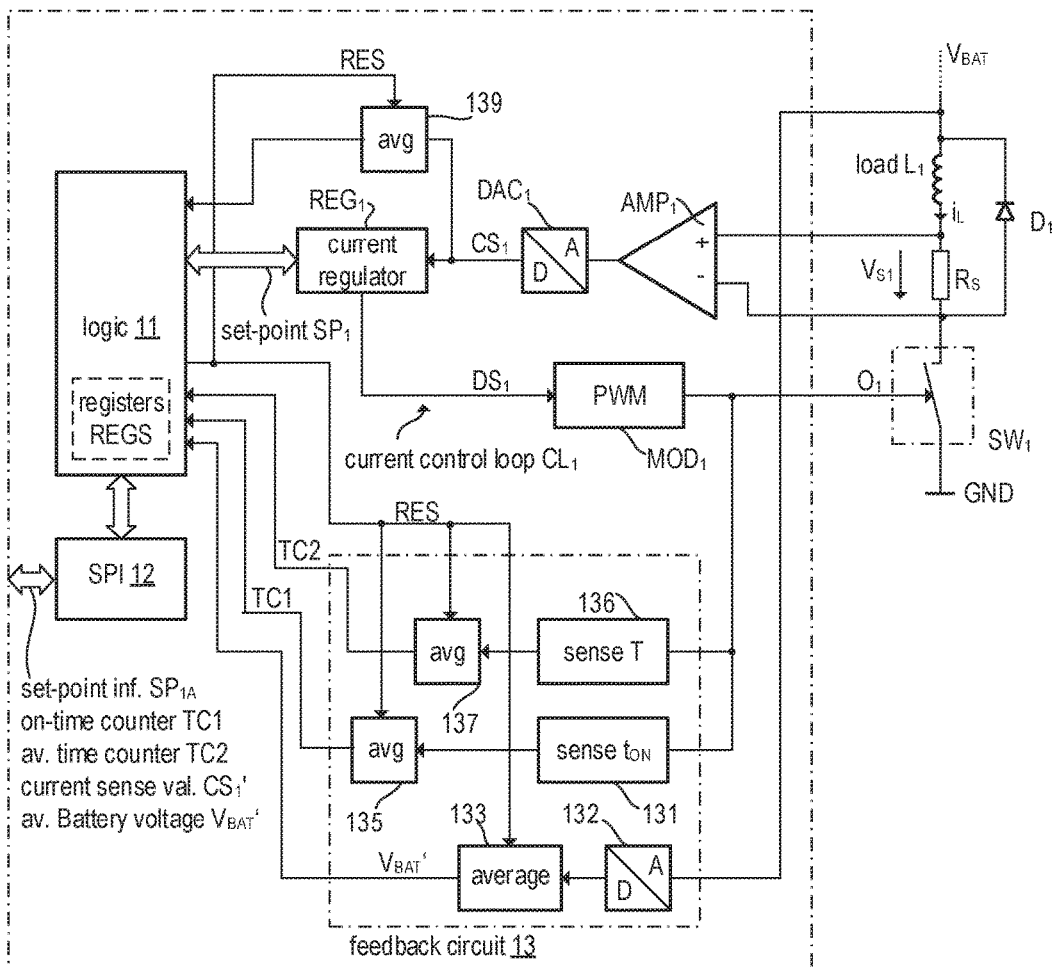
FIG. 7 illustrates a further modification of the example of FIG. 5A.

FIG. 7 illustrates a further example of a current control circuit 10 with a redundant feedback circuit 13. The example of FIG. 7 is substantially the same as in FIG. 6 but with an additional averaging circuit 139 which is configured to average the current sense signal $CS_1$ used in the current control loop $CL_1$ for current control. The operation of the averaging circuit 139 may also be synchronized with the operation of the averaging circuits 133, 135, and 137, so that an updated averaged signal is written into the registers REGS at the end of each averaging time period T. The averaged current sense signal $CS_1'$ may then be communicated to the MCU 20 together with the other digital values TC1, TC2, and $V_{BAT}'$. The averaged current sense signal $CS_1'$ may be used by the MCU 20 for plausibility checks.

Figure 8:
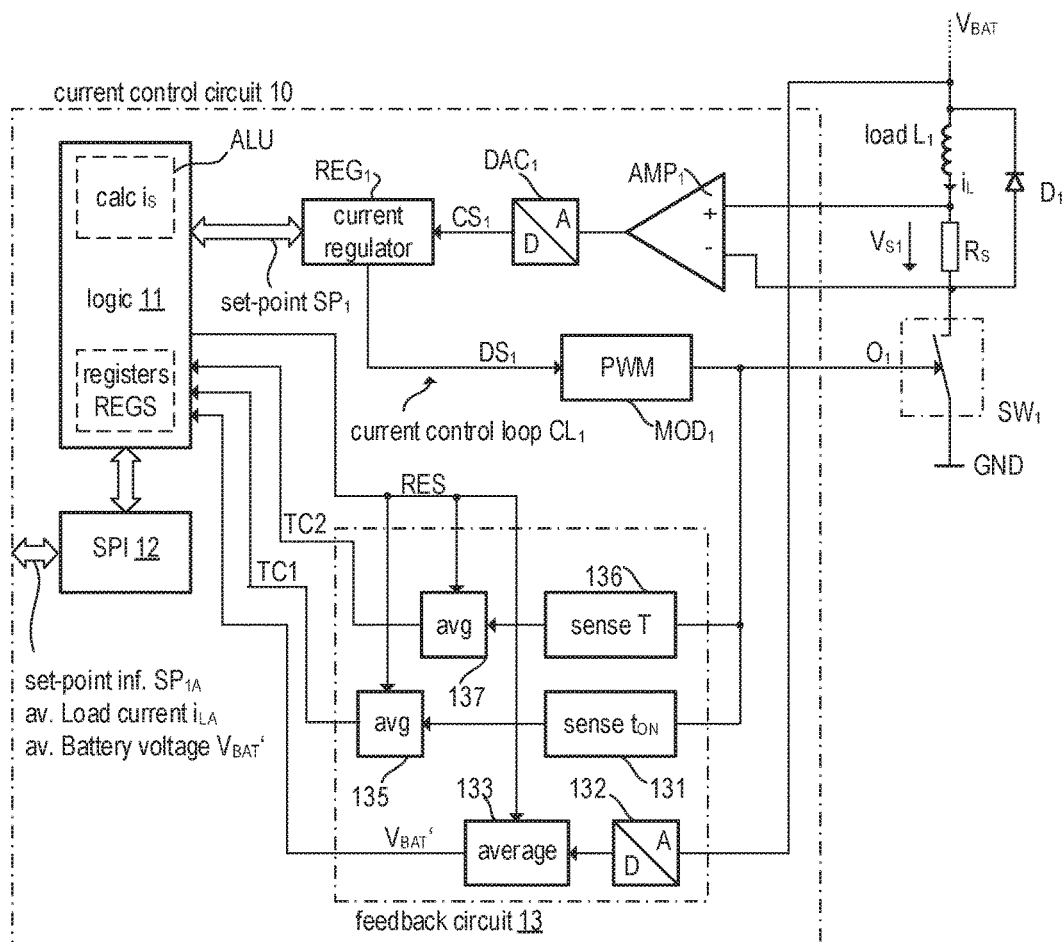
FIG. 8 illustrates another example of a current control circuit similar to FIG. 5A, wherein the average load current is determined within the current control circuit.

In the examples described above with reference to FIGS. 1 to 7, the actual value of the current average load current $i_{LA}$ is calculated by the MCU 20 based on the digital values (e.g. TC1, TC2, etc.) received from the current control circuit 10. Referring to equation 6, the average load current $i_{LA}$ basically depends on the (cumulated) on-time $t_{ON}$ (alternatively the off-time $t_{OFF}$), the averaging time period T, the averaged battery voltage $V_{BAT}'$ that determines the parameter $i_{MAX}$, and further constant parameters which are a-priori known. Dependent on the application, it may be useful to calculate the average load current values $i_{LA}$ within the current control circuit 10. The example of FIG. 8 is substantially the same as the example of FIG. 6 except that the logic circuit 11 includes an calculation circuit ALU (e.g. an arithmetic logic unit) that is configured to calculate (e.g. regularly in each averaging time period T) an updated average load current value $i_{LA}$ based on the digital value TC1 and, optionally, further based on the further digital values $T_{C2}$ and $V_{BAT}'$. In the present example, the calculation circuit ALU basically evaluates equation 6. The calculated average load current value $i_{LA}$ may then be communicated to the MCU 20. In one example, the calculation circuit ALU may be functionally separate (i.e. operate independently) from the remaining logic circuit 11 in order to increase functional safety. This functional separation may be accomplished by detecting and/or avoiding common cause failures (CCF) of the calculation circuit ALU and the remaining parts of the logic circuit 11.

As mentioned, the current control circuit 10 may be included in a dedicated chip package. Usually, the MCU 20 is also included in a separate chip package (see FIG. 1). As mentioned, the current control circuit 10 may have a plurality of output channels to drive a plurality of loads. For each output channel, an output pin $OUT_i$, and sense pins $P_i$ and $N_i$ may be provided (i=1, 2, . . . , N). For the sake of simplicity, only one output channel is shown in the examples described herein.

Exemplary embodiments are summarized below. It is, however, emphasized that the following is not an exhaustive enumeration of examples but rather an exemplary summary. The various features of the exemplary embodiments may be combined in any way unless explicitly stated otherwise. A first example (example 1) relates to a circuit arrangement that includes at least one output channel configured to be operably coupled to at least one load that is to be driven by the circuit arrangement. In the at least one output channel, the circuit arrangement includes a driver circuit configured to provide a modulated output signal, a current sense circuit configured to sense a load current passing through the load, and a feedback circuit configured to receive the modulated output signal and to determine, based on the modulated output signal, at least one digital value representing an average of the load current.

EXAMPLE 2

The circuit arrangement according to example 1, wherein the current sense circuit is configured to provide a current sense signal representing the load current, and wherein the at least one output channel further includes a regulator configured to receive a current set-point and the current sense signal, and to generate a regulator output signal based on the current set-point and the current sense signal.

EXAMPLE 3

The circuit arrangement according to example 2, wherein, in the at least one output channel, the driver circuit includes a modulator coupled to the regulator and configured to generate the modulated output signal based on the regulator output signal.

EXAMPLE 4

The circuit arrangement according to example 3, wherein, in the at least one output channel, the current sense circuit, the regulator and the modulator form a load current control loop.

EXAMPLE 5

The circuit arrangement according to any of the preceding examples, wherein, in the at least one output channel, the driver circuit includes a modulator configured to generate the modulated output signal based on a duty cycle value that is received from a controller.

EXAMPLE 6

The circuit arrangement according to any of the preceding examples, wherein, in the at least one output channel, the driver circuit includes an input configured to receive an input signal representing the modulated output signal.

EXAMPLE 7

The circuit arrangement according to any of the preceding examples, wherein, in the at least one output channel, the feedback circuit is functionally separate from the current sense circuit.

EXAMPLE 8

The circuit arrangement according to any of the preceding examples, wherein, in the at least one output channel, the feedback circuit is configured to sense a cumulated on-time of the modulated output signal or a cumulated off-time of the modulated output signal throughout an averaging time period; the at least one digital value representing the average of the load current includes the cumulated on-time or the cumulated off-time, respectively.

EXAMPLE 9

The circuit arrangement according to any of the preceding examples, wherein the modulated output signal is a binary signal including a sequence of pulses, each pulse having a pulse length followed by a pause; the cumulated on-time throughout the averaging time period is a sum of the pulse lengths of all pulses within the averaging time period, and the cumulated off-time throughout the averaging time period is a sum of the pulse lengths of all pulses within the averaging time period.

EXAMPLE 10

The circuit arrangement according to example 8 or 9, wherein, in the at least one output channel, the feedback circuit is configured to receive a signal indicative of a supply voltage and to provide a digital representation of an average of the supply voltage; the at least one digital value representing the average of the load current further includes the average supply voltage.

EXAMPLE 11

The circuit arrangement according to example 2 (or any other example including the regulator) further including a logic circuit configured to provide, for the at least one output channel, the current set-point to the regulator and to receive the at least one digital value representing the average of the load current.

EXAMPLE 12

The circuit arrangement according to example 11 further including a communication interface coupled to the logic circuit, wherein the logic circuit is configured to bidirectionally exchange information with a controller via the communication interface.

EXAMPLE 13

The circuit arrangement according to example 11 or 12, wherein the logic circuit is configured to receive current set-point information from a controller and to determine, for the at least one output channel, the current set-point for the regulator based on the received set-point information.

EXAMPLE 14

The circuit arrangement according to example 13, wherein the logic circuit is configured to receive a dither period from the controller and to determine, for the at least one output channel, the current set-point based on the received set-point information, such that the current set-point exhibits a dithering according to the dither period.

EXAMPLE 15

The circuit arrangement according to example 14, wherein the logic circuit is configured to set an averaging time period based on the dither period.

EXAMPLE 16

The circuit arrangement according to example 15, wherein the feedback circuit is further configured to update the at least one digital value representing the average of the load current in each averaging time period.

EXAMPLE 17

The circuit arrangement according to any of the example 11 to 16, wherein the logic circuit is configured to receive an averaging time period from a controller, and wherein the feedback circuit is further configured to update the at least one digital value representing the average of the load current in each averaging time period.

EXAMPLE 18

The circuit arrangement according to any of the preceding examples, wherein the current sense circuit includes an amplifier configured to receive a signal representing the load current and to generate an amplified signal representing the load current.

EXAMPLE 19

The circuit arrangement according to example 18, wherein the current sense circuit further includes an analog-to-digital converter coupled between the amplifier and the regulator and configured to digitize the amplified signal, thus providing a digital current sense signal.

EXAMPLE 20

The circuit arrangement according to example 2 (or any other example including the regulator) further including a logic circuit configured to receive current set-point information from a controller and to determine, for the at least one output channel, the current set-point for the regulator based on the received current set-point information, wherein the logic circuit is further configured to trigger a new averaging time period upon receiving new current set-point information from the controller.

EXAMPLE 21

The circuit arrangement according to example 2 (or any other example including the regulator) further including a logic circuit configured to receive current set-point information and a dither period from a controller and to determine, for the at least one output channel, the current set-point for the regulator based on the received set-point information, such that the current set-point exhibits a dithering according to the received dither period, and wherein the logic circuit is further configured to trigger a new averaging time period upon receiving one of new current set-point information and a new dither period from the controller.

EXAMPLE 22

The circuit arrangement according to any of the preceding examples further including a semiconductor die that includes, for the at least one output channel, the driver circuit, the current sense circuit, and the feedback circuit, wherein the feedback circuit is functionally separate from the current sense circuit.

EXAMPLE 23

The circuit arrangement according to any of the preceding examples further including, in the at least one output channel, a switch operably connected to the load, wherein the switch is configured to receive the modulated output signal and to connect the load with a supply voltage or a ground potential and disconnect the load from the supply voltage or the ground potential.

EXAMPLE 24

The circuit arrangement according to example 23 further including, in the at least one output channel, a shunt resistor coupled to the load, wherein the current sense circuit is configured to generate a current sense signal based on a voltage drop across the shunt resistor.

A further example (example 25) relates to an electronic control unit (ECU) for driving at least one load. Accordingly, the ECU includes at least one switch coupled to the at least one load and configured to switch a load current passing through the at least one load on and off. Further, the ECU includes a circuit arrangement with at least one output channel. The at least one output channel provides a modulated output signal that is supplied to a control electrode of the at least one switch. The circuit arrangement includes, in the at least one output channel, a driver circuit configured to provide a modulated output signal, a current sense circuit configured to sense a load current passing through the load, and a feedback circuit configured to receive the modulated output signal and to determine, based on the modulated output signal, at least one digital value representing an average of the load current. This example may be combined with or enhanced by any of the preceding examples.

Although the invention has been illustrated and described with respect to one or more implementations, alterations and/or modifications may be made to the illustrated examples without departing from the spirit and scope of the appended claims. For example, the modifications of FIGS. 5B to 5D may also be applied to any of the examples of FIGS. 6 to 8. In particular regard to the various functions performed by the above described components or structures (units, assemblies, devices, circuits, systems, etc.), the terms (including a reference to a "means") used to describe such components are intended to correspond—unless otherwise indicated—to any component or structure, which performs the specified function of the described component (e.g., that is functionally equivalent), even though not structurally equivalent to the disclosed structure, which performs the function in the herein illustrated exemplary implementations of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

We claim:

1. A circuit arrangement comprising:
   at least one output channel configured to be operably coupled to at least one load that is to be driven by the circuit arrangement,
   wherein, in the at least one output channel, the circuit arrangement comprises:
   a driver circuit configured to provide a modulated output signal;
   a current sense circuit configured to sense a load current passing through the load; and
   a feedback circuit configured to receive the modulated output signal and to determine, based on the modulated output signal, at least one digital value representing an average of the load current.

2. The circuit arrangement of claim 1, wherein the current sense circuit is configured to provide a current sense signal representing the load current, and wherein the at least one output channel further comprises:
   a regulator configured to receive a current set-point and the current sense signal, and to generate a regulator output signal based on the current set-point and the current sense signal.

3. The circuit arrangement of claim 2, wherein, in the at least one output channel, the driver circuit comprises:
   a modulator coupled to the regulator and configured to generate the modulated output signal based on the regulator output signal.

4. The circuit arrangement of claim 3,
   wherein, in the at least one output channel, the current sense circuit, the regulator and the modulator form a load current control loop.

5. The circuit arrangement of claim 2 further comprising:
   a logic circuit configured to provide, for the at least one output channel, the current set-point to the regulator and to receive the at least one digital value representing the average of the load current.

6. The circuit arrangement of claim 5 further comprising:
   a communication interface coupled to the logic circuit, wherein the logic circuit is configured to bidirectionally exchange information with a controller via the communication interface.

7. The circuit arrangement of claim 5,
   wherein the logic circuit is configured to receive current set-point information from a controller and to determine, for the at least one output channel, the current set-point for the regulator based on the received set-point information.

8. The circuit arrangement of claim 7,
   wherein the logic circuit is configured to receive a dither period from the controller and to determine, for the at least one output channel, the current set-point based on the received set-point information, such that the current set-point exhibits a dithering according to the dither period.

9. The circuit arrangement of claim 8,
   wherein the logic circuit is configured to set an averaging time period based on the dither period.

10. The circuit arrangement of claim 8,
    wherein the feedback circuit is further configured to update the at least one digital value representing the average of the load current in each averaging time period.

11. The circuit arrangement of claim 5,
    wherein the logic circuit is configured to receive an averaging time period from a controller, and
    wherein the feedback circuit is further configured to update the at least one digital value representing the average of the load current in each averaging time period.

12. The circuit arrangement of claim 2 further comprising:
    a logic circuit configured to receive current set-point information from a controller and to determine, for the at least one output channel, the current set-point for the regulator based on the received current set-point information,
    wherein the logic circuit is further configured to trigger a new averaging time period upon receiving new current set-point information from the controller.

13. The circuit arrangement of claim 2 further comprising:
    a logic circuit configured to receive current set-point information and a dither period from a controller and to determine, for the at least one output channel, the current set-point for the regulator based on the received set-point information, such that the current set-point exhibits a dithering according to the received dither period, and
    wherein the logic circuit is further configured to trigger a new averaging time period upon receiving one of new current set-point information and a new dither period from the controller.

14. The circuit arrangement of claim 1, wherein, in the at least one output channel, the driver circuit comprises:
a modulator configured to generate the modulated output signal based on a duty cycle value that is received from a controller.

15. The circuit arrangement of claim 1, wherein, in the at least one output channel, the driver circuit comprises:
an input configured to receive an input signal representing the modulated output signal.

16. The circuit arrangement of claim 1,
wherein, in the at least one output channel, the feedback circuit is functionally separate from the current sense circuit.

17. The circuit arrangement of claim 1,
wherein, in the at least one output channel, the feedback circuit is configured to sense at least one of a cumulated on-time of the modulated output signal or a cumulated off-time of the modulated output signal throughout an averaging time period, and
wherein the at least one digital value representing the average of the load current comprises the at least one of the cumulated on-time or the cumulated off-time.

18. The circuit arrangement of claim 17,
wherein, in the at least one output channel, the feedback circuit is configured to receive a signal indicative of a supply voltage and to provide a digital representation of an average of the supply voltage, and
wherein the at least one digital value representing the average of the load current further comprises the average supply voltage.

19. The circuit arrangement of claim 1,
wherein the modulated output signal is a binary signal comprising a sequence of pulses, each pulse having a pulse length followed by a pause; and
wherein the cumulated on-time throughout the averaging time period is a sum of the pulse lengths of all pulses within the averaging time period, and the cumulated off-time throughout the averaging time period is a sum of the pulse lengths of all pulses within the averaging time period.

20. The circuit arrangement of claim 1,
wherein the current sense circuit includes an amplifier configured to receive a signal representing the load current and to generate an amplified signal representing the load current.

21. The circuit arrangement of claim 20,
wherein the current sense circuit further includes an analog-to-digital converter coupled between the amplifier and the regulator and configured to digitize the amplified signal, thus providing a digital current sense signal.

22. The circuit arrangement of claim 1 further comprising:
a semiconductor die that comprises, for the at least one output channel, the driver circuit, the current sense circuit, and the feedback circuit,
wherein the feedback circuit is functionally separate from the current sense circuit.

23. The circuit arrangement of claim 1 further comprising, in the at least one output channel:
a switch operably connected to the load, wherein the switch is configured to receive the modulated output signal and to connect the load with a supply voltage or a ground potential and disconnect the load from the supply voltage or the ground potential.

24. The circuit arrangement of claim 23 further comprising, in the at least one output channel:
a shunt resistor coupled to the load, wherein the current sense circuit is configured to generate a current sense signal based on a voltage drop across the shunt resistor.

25. An electronic control unit (ECU) for driving at least one load, the ECU comprising:
at least one switch coupled to the at least one load and configured to switch a load current passing through the at least one load on and off;
a circuit arrangement with at least one output channel, the at least one output channel providing a modulated output signal that is supplied to a control electrode of the at least one switch;
wherein the circuit arrangement comprises, in the at least one output channel:
a driver circuit configured to provide a modulated output signal;
a current sense circuit configured to sense a load current passing through the load; and
a feedback circuit configured to receive the modulated output signal and to determine, based on the modulated output signal, at least one digital value representing an average of the load current.

* * * * *